United States Patent [19]
Hill

[11] Patent Number: 5,345,584
[45] Date of Patent: Sep. 6, 1994

[54] SYSTEM FOR MANAGING DATA STORAGE BASED ON VECTOR-SUMMED SIZE-FREQUENCY VECTORS FOR DATA SETS, DEVICES, AND RESIDUAL STORAGE ON DEVICES

[75] Inventor: Reed A. Hill, San Jose, Calif.

[73] Assignee: Laclead Enterprises, Ogden, Utah

[21] Appl. No.: 667,222

[22] Filed: Mar. 11, 1991

[51] Int. Cl.$^5$ ............... G06F 15/40; G06F 12/02; G06F 13/00
[52] U.S. Cl. ................... 395/600; 395/425; 395/700; 364/DIG. 1; 364/245.2; 364/246; 364/246.3; 364/282.2; 364/282.4
[58] Field of Search ............. 395/600, 425, 650

[56] References Cited

U.S. PATENT DOCUMENTS

| | | | |
|---|---|---|---|
| 3,725,875 | 4/1973 | Choate et al. | 340/172.5 |
| 4,104,718 | 8/1978 | Poublan et al. | 395/600 |
| 4,528,624 | 7/1985 | Kamionka et al. | 395/650 |
| 4,542,458 | 9/1985 | Kitajima et al. | 364/200 |
| 4,607,346 | 8/1986 | Hill | 395/425 |
| 4,703,422 | 10/1987 | Kinoshita et al. | 364/200 |
| 4,974,145 | 11/1990 | Aoyama et al. | 395/800 |
| 5,018,060 | 5/1991 | Gelb et al. | 395/600 |
| 5,131,087 | 7/1992 | Warr | 395/425 |
| 5,142,670 | 8/1992 | Stone et al. | 395/425 |
| 5,151,990 | 9/1992 | Allen et al. | 395/650 |
| 5,155,835 | 10/1992 | Belsan | 395/425 |
| 5,193,171 | 3/1993 | Shinmura et al. | 395/425 |
| 5,226,141 | 7/1993 | Esbensen | 395/425 |
| 5,263,145 | 11/1993 | Brady et al. | 395/425 |
| 5,276,867 | 1/1994 | Kenley et al. | 395/600 |

*Primary Examiner*—Thomas C. Lee
*Assistant Examiner*—Wayne Amsbury
*Attorney, Agent, or Firm*—Terry M. Crellin

[57] ABSTRACT

A method for managing allocation of data sets among A plurality of storage devices of a computing apparatus such that the data set are allocated to a storage device whose uncommitted storage volume and access capability most nearly meet the requirement of the particular data set and the data sets are further allocated in such a way that access activity to the data sets will be distributed substantially uniformly across all the storage devices. The method comprises the steps of:

(1) monitoring and recording data set access activity as a function of time:
(2) calculating the data storage factor of each data set;
(3) calculating a machine storage factor of each storage device;
(4) calculating the residual storage factor of each storage device;
(5) allocating the data set to a storage device that has sufficient available space and whose residual storage factor most nearly matches and exceeds the data storage factor of the data set being allocated.

3 Claims, 1 Drawing Sheet

SYSTEM FOR MANAGING DATA STORAGE BASED ON VECTOR-SUMMED SIZE-FREQUENCY VECTORS FOR DATA SETS, DEVICES, AND RESIDUAL STORAGE ON DEVICES

BACKGROUND OF THE INVENTION

1. Field of the Invention

The present invention relates to a novel method for storing digital data in a storage system comprising a plurality of data storage devices and for managing the storage of digital data among the storage devices to achieve optimum utilization of the data storage devices in the system.

2. State of the Art

Devices used in storing digital data in computer systems have the capability of storing sets of data and the means to access the data sets. Depending upon the sophistication of the technology and design of the individual storage devices, each device can sustain a certain number of accesses each second. Each device is also capable of storing a prescribed amount of data. A significant problem in the storage of digital data on direct access storage devices is characterized as "device bottleneck". That is, when a storage device receives access requests from a processor at a faster rate than the device can sustain, the processor is forced to wait. This results, in many cases, in a catastrophic degradation of throughput, i.e. the rate at which data records are stored on or retrieved from data sets on the storage device.

The growth and diversification of data processing systems has resulted in the need for storing data collections having a wide range of access characteristics. At one extreme it is necessary to access the data as much as 100 or more times per second per megabyte of data stored. While at the other extreme, the data is stored in case it is needed for reference. When closed, a data collection is not accessed at all. If that data collection occupies space on a high performance storage device which is inactive, the use of that storage capability is inefficient and the cost is high. Or if data requires an access frequency beyond the capability of the device on which it is stored, there is a significant degradation of the data processing system in terms of response time and/or throughput reducing the cost performance of the system.

Another characteristic of the use of a data collection is that it is opened during certain periods of time and can be referenced by more than one application program sharing the same data collection. Because the current techniques of data collection placement is unable to effectively consider the time domain of use, there is a significant skew in the utilization of the components of the data storage system such as the channel, controller, and storage devices. This causes degradation of the data processing system performance and the inefficient use of the components of the system.

In data storage systems, the storage devices are connected to the central computer through controllers and channels. While the principle function of the channel and controller is to execute control logic, they also provide the path over which the data is transmitted. The processing power of these two components determine the number of control sequences that can be executed in a given unit of time. Because the demand for data is not a synchronous process, queuing characteristics become apparent. There is an accelerated lengthening of wait time and a rapid increase in queue lengths when utilization goes beyond 30%.

One strategy implemented at some computer installation for managing device bottleneck is to have a person, usually a data base administrator, manually examine the device (that is, scan the contents of the device), and select for removal to other devices sufficient data sets so that accesses to the data sets remaining on the device will not exceed the device capability. Another strategy for managing device bottleneck implemented by some data base administrators is to allocate to a data set much more physical space on a device than is required. The space allocated in excess of requirements is, therefore, not written with data by this or other programs, with a resulting decrease in access demand on the device from other applications which would, except for the excess allocation, be accessing additional data on the device.

When a plurality of data storage devices are available, having different access characteristics (such as disk and tape storage devices), it is known to allocate frequently used data to the disks which are faster and to allocate less frequently used data to the slower devices. A further approach to the problem of bottlenecks provides an interface unit, including buffer storage and a control processor, which queues data for transfer with respect to a central processor and a plurality of storage devices of varying characteristics.

Generally, however, the storage of data is defined by the user/operator of the system. The user/operator prescribes where the data will be placed. Unable to predict the use of data with sufficient precision, the user/operator frequently places data in such a way that the storage device is unable to provide the required number of accesses during periods of peak demand by the central processor, resulting in excessive response times and overall system degradation. This results in considerable effort on the part of the user to tune his system or, in other words, to rearrange his stored data to relieve the excessive access burden on a particular device or set of devices. In the case where the user has several different kinds of storage devices that have different access rates and/or storage capacities, the user will attempt, on an intuitive basis, to place the data sets on devices that more nearly provide the performance required, and when using devices that are not well matched to this requirement, the user will over allocate space in an attempt to assure a sufficient access rate to a articular data set. Thus, even while not effectively accomplished, a great deal of effort by highly skill personnel is required to place data sets and to monitor system performance. If data storage capacity is not used effectively (resulting in wasted storage capacity and/or access capability), the data storage system generally operates in a degraded mode with human intervention occurring when degradation becomes intolerable, and data sets frequently are not placed on devices that most nearly meet the access and storage characteristics of the data.

Furthermore, data sets are generally placed on storage devices without sufficient understanding of the time when the data will be used, As a result, the data being used at any given time may be concentrated on one storage device or collection of storage devices being controlled by a single controller and/or a single channel. This significant skewing of the utilization of storage system components such as the storage devices, controllers, channels, and data paths results in significant wait times and the attendant lower performance of the data processing system.

As a result of the inability to place data sets effectively, it is not uncommon to observe average channel utilization of 15%, controller utilization of 5% to 10% and data storage device access utilization of 5% to 7%. This evidences an inefficient mix of data storage system components and the resultant cost to store the data is significantly higher than is warranted.

There are many factors that can vary the work load of a data storage system, such as the introduction of additional applications, a change in external procedures which alter times of processing, introduction of increased processing capability, a modification in the number of instructions executed per access in an existing application, etc. These influences occur in real time and cause significant changes in access requirements and component utilization that are not detected until a serious problem develops. This lack of system responsiveness to the changing demands requires significant time and effort to analyze the problem and to attempt a solution which at present is at best a cut and try effort.

In my previous U.S. Pat. No. 4,607,346, the entire contents of which are incorporated herein by reference, a method is provided for operating computing apparatus to automatically allocate data sets among storage devices to minimize system degradation by reducing device bottlenecks. In accordance with my previous patent, the access density of each data set being stored is determined, wherein access density is defined as the number of accesses per unit time to the particular data set divided by the volume of that data set. The access density of each of the storage devices in the system is calculated wherein the access density is the number of accesses that the particular device can sustain per unit of time divided by the data storage capacity of the device. Data sets are then allocated and reallocated as a result of continuous monitoring the storage characteristics of the data sets and the storage devices such that the data sets are stored on a storage device having an access density most nearly matching the access density of that data set.

The method of my previous U.S. Pat. No. 4,607,346 does a good job of managing files on a single storage device or on individual storage devices that are part of a group of such storage devices used in combination with the computer apparatus. However, there is no provision for characterizing the unused capacity of a storage device or for managing a plurality of such storage devices in such a manner that balancing of requirements, allocations and characteristics of all the storage devices as a group is achieved. Thus, while the method of my previous U.S. Pat. No. 4,607,346 may achieve good utilization of an individual storage device, it may overwork individual storage devices, especially at high use periods in the operational day, and it fails to fully utilize other storage devices to the best advantage of the storage system, i.e., the entire group of storage devices.

Considerable effort is expended by highly skilled personnel to place data on the storage devices such that device bottlenecks can be avoided and/or the data store can sustain a reasonable throughput. In spite of the effort applied the problems of system bottleneck and system queuing remains.

OBJECTIVES

A principal objective of the invention is to provide an improved, novel method of managing the allocation of data sets among a plurality of storage devices that are used as a storage system in combination with computing apparatus.

In particular, it is an objective of the present invention to provide such an improved method of managing a plurality of storage devices in a manner such that system degradation is minimized by a combination of two interrelated means. Each data set is placed on a storage device whose uncommitted storage volume and access capability most nearly meet the requirement of that particular data set, and all the storage devices are utilized to their maximum combined efficiency by further placing data sets amongst the individual storage devices in such a way that access activity to the data sets is distributed substantially uniformly across all the storage devices of the system.

Another objective of the present invention is to provide a system for managing a plurality of storage devices wherein new storage devices can be added to the system and current storage devices can be removed from the system substantially automatically without the meed of manually transferring data sets to or from such storage devices.

BRIEF DESCRIPTION OF THE INVENTION

The above objectives are achieved in accordance with the present invention by providing a novel method of managing the allocation of data sets among a plurality of storage devices. The method, which is advantageously programmed into the computer apparatus to be automatically run or performed by the computer apparatus, achieves the following desirable benefits:

(a) excessive effort by highly skilled people in placing data sets on the plurality of storage devices, even when the devices have varying characteristics, is unnecessary and can be eliminated, (b) degradation of data processing as a result of inefficient use of individual storage devices or inefficient use of all the storage devices as a combined system is eliminated, (c) highly skewed utilization of the storage devices in the storage system is eliminated, (d) inefficient mix of channels, controllers and data storage devices is avoided, (e) improved responsiveness to changing storage demands during data processing is achieved, and (f) difficulty in adding new storage devices or of removing current storage devices from a data storage system is eliminated.

The present invention provides a method, which as mentioned before, can be program/ned into the computer apparatus to be automatically operated or run by the computer apparatus. The method provides means for automatic specification and/or placement of data collections on the device whose uncommitted storage and reference capabilities most nearly meet the requirement of the data collection. All data sets are placed in such a way that data reference activity will be distributed more evenly across all the storage devices of the data storage system by time period throughout the operational day of the computer apparatus. The result will be that data sets having particularly heavy utilization at particular times during the operational day of the computer can be handled without experiencing device bottleneck. Further, significant utilization skew of storage system components is significantly decreased so as to diminish wait time and increase throughput.

The present invention will also provide the means for efficiently and substantially automatically removing data sets from a storage device that is to be removed from the storage system or of adding data sets to a data storage device that has been added to the storage system. For the device that is to be removed, the method of the present invention provides for substantially automatically moving of data sets from that storage device to another storage device in the storage system while maintaining effective performance. Effective utilization of the storage device which is being removed from the system is maintained until all data sets have been removed therefrom. In this way, all data sets which have not yet been moved from the storage device which is to removed from the system are always accessible from that storage device. Once moved, of course, a data set is accessible on the storage device to which it has been moved. For a data storage device that is being added to the storage system, data sets are moved substantially automatically to the new storage device in a way as to maintain or improve the effective utilization of that storage device as well as the storage system as a whole.

In accordance with the method of the present invention, data sets are allocated among a plurality of storage devices operating as a storage system of a computing apparatus in such a manner that system degradation is minimized. This is in part accomplished by placement of each of the data sets on a storage device whose uncommitted storage volume and access capability most nearly meets the requirement of that particular data set. In addition, the storage devices, as a group, are utilized with maximum efficiency by further placing data sets in such a way that access activity to the data sets is distributed substantially uniformly across all the storage devices in the storage system.

The novel method for managing the use of the storage devices in the storage system comprises calculating the data storage factor of each data set that is stored in the system. The data storage factor is defined as the vector sum, in a cartesian coordinate system, of the number of accesses per unit time to the particular data set and the volume of data in that data set. A machine storage factor of each storage device is also calculated, with the machine storage factor being defined as the vector sum, in a cartesian coordinate system, of the total storage capacity of the particular storage device and the number of accesses the particular device can sustain per second. Further, the residual storage factor of each storage device is calculated, wherein the residual storage factor is indicative of the available or uncommitted storage capacity of the particular device and is defined as the vector difference, in a cartesian coordinate system, of the machine storage factor of the particular device and the vector sum, in a cartesian coordinate system, of the data storage factors of the data sets stored on that particular storage device. The data sets are allocated to respective storage devices that have sufficient available space and whose residual storage factor angle most nearly matches the data storage factor of the data set being allocated.

Balancing of data sets among the storage devices is accomplished so as to achieve the most efficient operation of the storage system. Balancing is done in a preferred embodiment of the invention by first dividing the operational day of the computing apparatus into a predetermined number of time periods, and the time period during the previous operational day that the storage devices as a group were least utilized is determined. The time period in the current operating day corresponding to the time period of least utilization of the storage devices during the previous operating day is used to move data sets among the storage devices so as to balance the residual storage factors of all the storage devices for each of the time periods, starting with the time period of maximum use of the storage devices as a group and proceeding progressively to the time period of minimum use of the storage devices as a group.

The moving of data sets among the storage devices to balance the residual storage factors of all the storage devices for each time period is advantageously done by the following steps which can be performed automatically by the method of the present invention when programed into the computer apparatus itself or with the assistance of another computer apparatus:

monitoring and recording the access activity of each data set;

recalculating the data storage factors of each data set and the residual storage factor of each storage device;

calculating the average residual storage factor for all the storage devices;

removing one or more data sets from any storage device whose residual storage factor is less than a preset lower limit; and reallocating any data set removed from a storage device to another storage device whose residual storage factor after reallocation of such data set is equal to or greater than the preset lower limit.

Additional objects and features of the invention will become apparent from the following detailed description taken together with the accompanying drawings.

DETAILED DESCRIPTION OF THE INVENTION

The method of the present invention is based on a set of mathematics and functions defined in a cartesian coordinate space having the ordinate representing references or access per second and the abscissa representing volume or capacity such as megabytes. The method of the present invention uses the data storage figures of merit called access density and storage factor. Access density is a function of volume and frequency of reference, and storage factor is a vector function of volume and frequency of reference.

Access density (AD) is defined to mean the number of references per second divided by the volume or capacity measured in megabytes. Relative to the data collection or set, access density (AD) is equal to the number of references (RD) per second to that data collection or set divided by the number (VD) Of megabytes of data in the data collection or set. This relation is shown in Equation 1.

$$AD = RD/VD \tag{1}$$

Relative to the data storage machine or device, access density (AM) is equal to the available accesses (RM) that the machine or device can provide per second divided by the available data storage capacity (VM) in megabytes. This relationship is shown in Equation 2.

$$AM + RM/VM \tag{2}$$

The storage factor is defined as a vector in the cartesian coordinate space described. It is the sum of the access or reference vector and the volume or capacity vector defined in that same space. The data storage factor (FD) the vector sum of the references (RD) per second to a collection or set of data and the volume (VD) of data in the data collection or set in megabytes. This relationship is shown in equation 3.

$$FD = VP + RD \tag{3}$$

The machine storage factor (FM) is the vector sum of the storage capacity (VM) in megabytes available on the data storage machine and the number of accesses ore references (RM) the machine can sustain per second. This relationship is shown in equation 4.

$$RM = VM + RM \tag{4}$$

The term RM is also referred to hereinafter as the reference characteristic of the storage device.

Important to this invention is the concept of the residual storage factor (FR) which is the uncommitted storage capability of a data storage device or system. The residual storage factor of a data storage device or machine FMR is the vector sum of the available or uncommitted storage capacity VMR. This relationship is shown in equation 5.

$$FMR = VMR + RMR \tag{5}$$

The machine residual storage factor (FMR) is defined as the vector difference of the machine storage factor (FM) and the vector sum of the data storage factors (FDx) where x ranges from 1 to N, and N is equal to the number of data collections or sets already stored on the data storage machine or device. This relationship is shown in equation 6.

$$FR = FM - FDX \tag{6}$$

While access density (AD) is a scalar number and the storage factor FP is a vector number, access density is the slope of the related storage factor vector.

In this invention, the data storage factor (FD) Of each data collection or set is monitored and updated along with the residual storage factor (FMR) of the respective data storage machines or devices as a function of the time of day. The data collection or set is placed on the appropriate data storage device based on the storage factor of the data collection or set and the residual storage factor of the storage machine or device.

A preferred embodiment of the method of managing the allocation of data sets among the storage devices will now be given. At the time a data storage device is attached to the data storage system it's identification is entered in a storage device list (SDL). The reference characteristic (RM) and the capacity for data storage characteristic (VM) Of the storage device are also entered in a device control table (DCT).

At the time a data set is created it's name or identifier is entered in a data set name list (DSNL) and a first approximation of the magnitude of its reference characteristic $|RD|$ and it's volume $|VD|$ are entered in a data set control table (DSCT). The absolute bar symbols are used to denote that the value is a magnitude quantity of a vector entity. Space is reserved on the data storage machine having a residual storage factor (FMR) that will accommodate the data storage factor (FD) while maintaining the effective utilization of the overall data store. The data storage machine or device is also chosen such that the data volume $|VD|$ is equal to or less than the available storage capacity $|VMR|$ Of the data storage machine or device, and the frequency of reference to the data collection $|RD|$ is equal to or less than the uncommitted access capability $|RMR|$ of the machine or device.

The residual storage factor is then modified and entered in the DCT and the data storage machine's identifier is entered in the DSNL. Data collections or sets having a data access density (AD) that is greater than a prescribed threshold access density (AT) will be identified for caching and will reside on a data storage machine based on its characteristics at close. A caching bit is set in the DSCT.

At data set open time, the staging bit in the DSCT is tested. If it is set on the data collection or set will be moved to the data storage machine or device having a residual storage factor (FMR) that is most nearly congruent to the data storage factor (FD) and where the data volume $|VD|$ is equal to or less than the available storage capacity $|VMR|$ of the data storage machine or device and the frequency of reference to the data collection $|RD|$ is equal to or less than the uncommitted access capability of the storage device $|RMR|$. At start input/output time the system will collect reference count for the data collection (RC). At the completion of each predefined time period (TP) in seconds, if the reference count (RC) for the period is significantly greater than the data collection references (RD) recorded in the DSCT, the new data collection references (RD) will be placed in the DSCT.

At data set close time, the data set will remain on the storage device that most nearly matches the storage factor (FD) of the data set when it is open. When space is required on the device by a data set being opened having a storage factor (FD) that most nearly matches the storage factor (FM) of that storage device, the space occupied by closed data sets will be made available and if the closed data set has been modified and there has been no write through, it will be copied to the backup location.

If at the data set open time the staging bit in the DSCT is set off, the data collection or set will be accessed from its resident device. At start input/output time the system will collect reference count for the data collection (RC). At the completion of each predefined time period (TP) in seconds, if the reference count (RC) for the period is significantly greater than the data collection references (RD) recorded in the DSCT, the new data collection references (RD) will be placed in the DSCT. At data set close time or when it is not open, there will be no relocation of the data collection or set.

Balancing of the storage system by moving data sets among the storage devices of the storage system occurs when the storage system as a whole is least active. The time period for balancing is determined by taking the sum of the residual data storage references (RMRX) where x is from 1 to N, with N being the number of storage devices and residual references being the references available in a given time period. This is done for each time period. The time period that has the maximum residual references (RMR) will be the time period that will be designated as the balancing time period. Balancing will be directed to the time period that the sum of the residual data storage references is the smallest (RRX(MIN)), i.e., to the period of maximum use of the storage devices as a group.

Balancing or moving of data sets among the storage devices to balance the residual storage factors of all the storage devices is done by first summing the residual references of the storage devices, wherein residual reference is defined as the additional accesses per second the particular device can sustain in addition to the accesses per second allocated to existing data sets on that device. The residual volumes of the storage devices is then summed, wherein the residual volume is defined as the additional volume of the particular device that is not allocated to existing data sets on that device. The magnitude of the composite residual storage factor is calculated as the square root of the sum of the squares of the summed residual references and the summed residual volumes.

The direction of the composite residual storage factor is calculated, wherein the direction of the composite residual storage factor is defined as the angle a having the tangent equal to the summed residual references divided by the summed residual volumes. An average composite residual storage factor per storage device is calculated as the magnitude of the composite residual storage factor divided by the number of data storage devices, with the average composite residual storage factor having a direction defined by the angle $\phi$ whose tangent is equal to the sum/ned residual accesses divided by the summed residual volumes.

The direction of the residual storage factor of each storage device is calculated as the angle $\beta$ whose tangent is equal to the residual reference of the particular storage device divided by the residual volume of the particular storage device. A storage factor limit of each storage device is calculated, wherein the storage factor limit is defined as the residual storage factor of the particular storage device minus the average composite residual storage factor per storage device.

If the vector difference of the device residual storage factor minus the composite residual storage factor does not fall in the first quadrant, one or more data sets is moved from that particular data storage device to another data storage device having a residual storage factor that is greater than the residual storage factor of the particular storage device. Expressed in a modified form, if the access density limit, defined as angle $\alpha$ minus angle $\beta$, for a particular storage device is less than zero, or if the storage factor limit is less than a preset lower limit, one or more data sets is moved from that particular data storage device to another storage device having a residual storage factor that is greater than the residual storage factor of the particular storage device.

The invention will now be explained by referring to two preferred embodiments as shown in the accompanying drawings.

Figure 1:
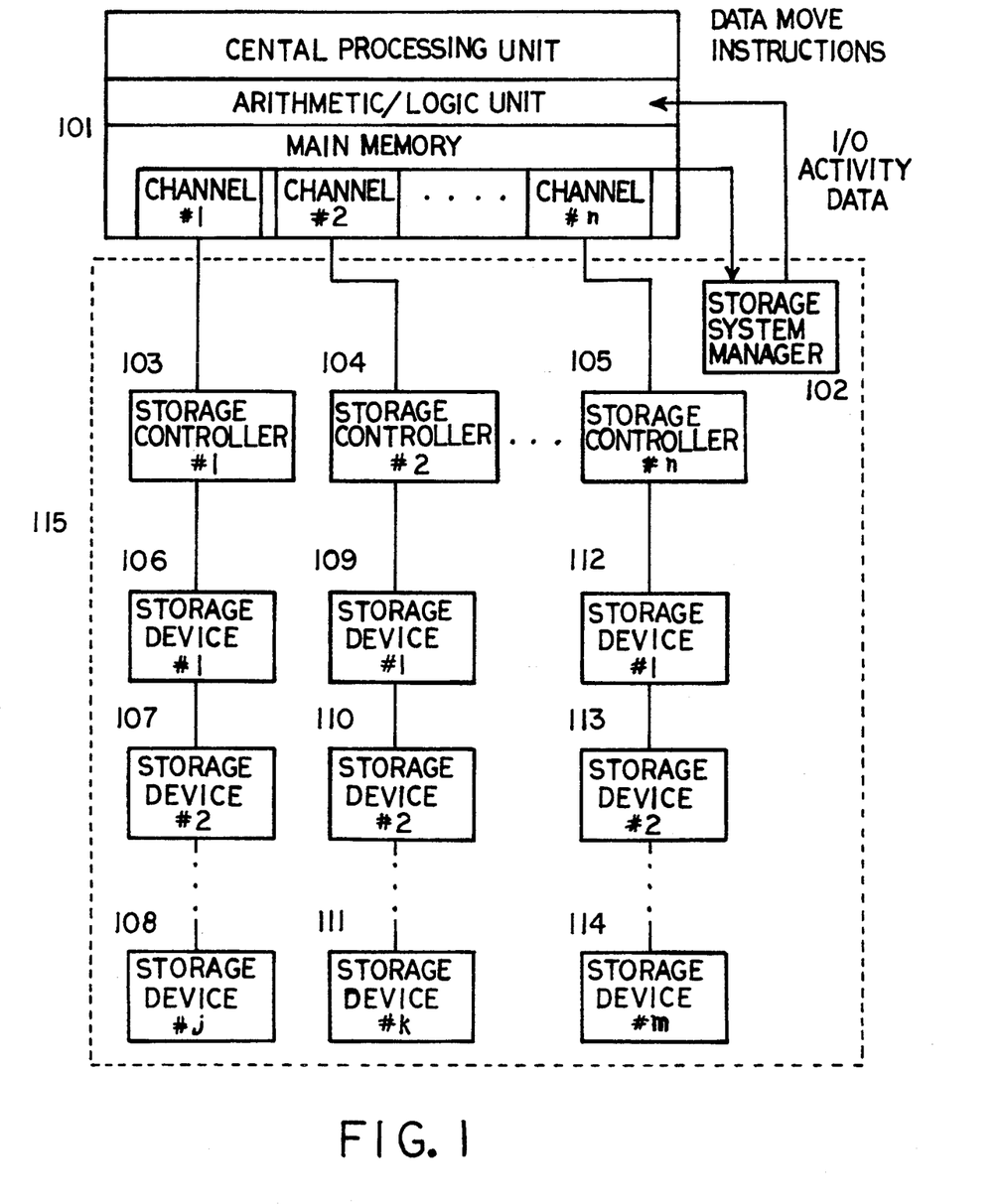
FIG. 1 is a schematic diagram of a data systems serving a single central processing unit according to an embodiment of the invention.

FIG. 1 shows the construction of the first embodiment. In this embodiment the central processing unit 101 comprised of an arithmetic logic unit, main or real memory, and n channels is connected to a data storage system 115 comprised of a storage system manager 102, n storage controllers 103, 104, and 105. To each of the storage controllers is attached a string of one or more data storage devices having the same or different storage characteristics. There are j data storage devices 106, 107, and 108 that are connected to storage controller #1, 103; k storage devices 109, 110, and 111 that are connected to storage controller #2, 104; and m storage devices 112, 113, 114 that are connected to storage controller #n, 105.

The storage system manager 102 according to the invention must provide the following functions:

(1) Allow definition of the storage systems physical configuration to provide the parameters required by the analytical, device characterization, and data placement algorithms.

(2) Capture and store information relative to data input and output actions of the central processing unit 101 sufficient for the analytical, data characterization, and data placement algorithms.

(3) Facilitate the entry of specifications to govern time periods for data storage balancing, time resolution for data characterization, storage capacity utilization factor, frequency of storage balancing, the period of data collection inactivity before data archiving.

(4) Provide for the adding and removing of storage system components such as channels, controllers, storage devices, etc.

Figure 7:
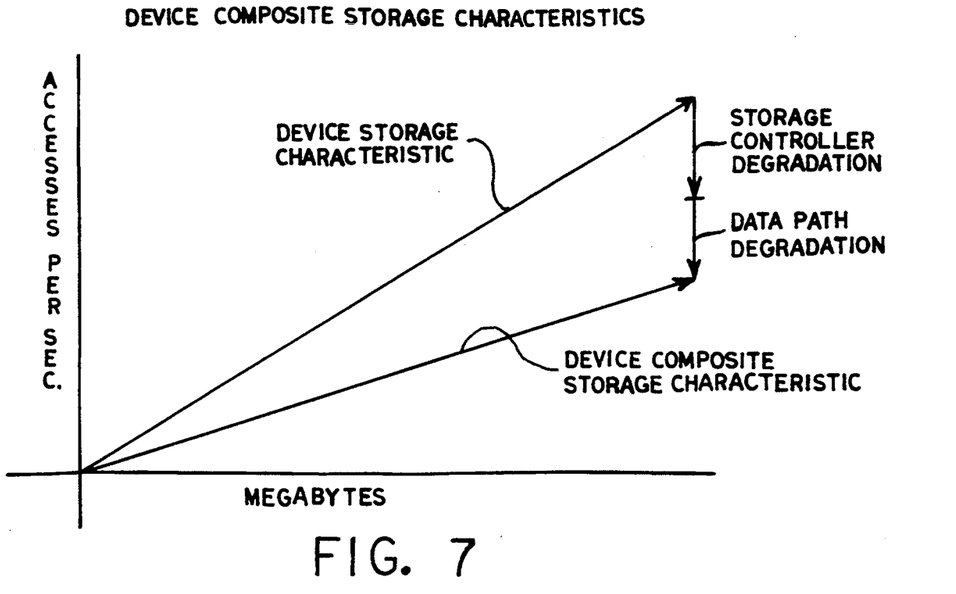
FIG. 7 is a graph showing the Device Storage Characteristic, Storage Controller Degradation, Data Path Degradation, and the Device Composite Storage Characteristic.

(5) Determine the degradation of the data storage devices caused by the storage system components such as channels, storage controllers, and data paths and calculate the device composite storage characteristic (FIG. 7).

(6) Process the information relative to data input and output to characterize the data collections being managed by the storage system manager.

(7) Process the data storage device parameters to characterize the data storage devices.

(8) Use the data storage device characterization information and the data collection characterization information to determine the location for data collections in the data storage system to eliminate bottle necks, to achieve a shortened response time, and a higher utilization of the storage capacity.

(9) Generate the data move instructions that will move the selected data collections to the preferred locations.

Figure 4:
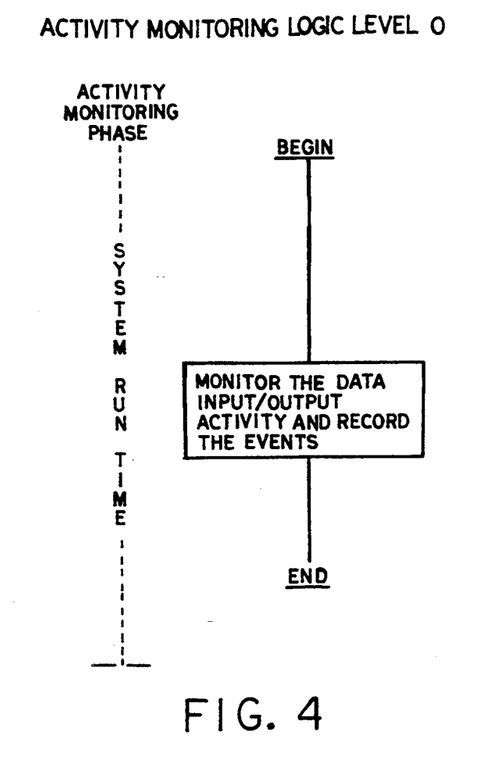
FIG. 4 is a flow chart showing the logical steps by the Storage System Manager during system run time with normal application processing for activity monitoring according to the invention.
Figure 5:
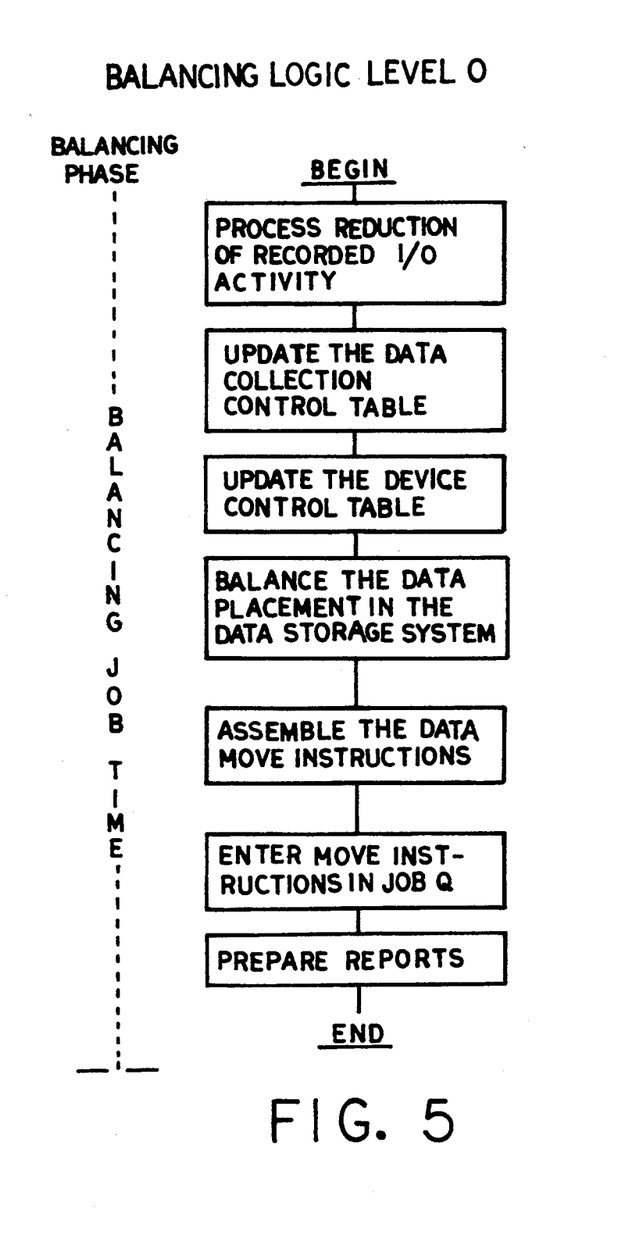
FIG. 5 is a flow chart showing the logical steps by the Storage System Manager during balancing job time for data reduction, processing of storage balancing algorithms, and creation of data move instructions according to the invention.

To accomplish these functions the storage system manager 102 provides an install/change phase(FIG. 3), an activity monitoring phase (FIG. 4), and a glancing phase (FIG. 5).

An example of the storage system manager 102 functions will now be amplified.

Upon the incidence of installing the storage system manager 102 or changing the physical configuration of the data storage system 115 under the control of the storage system manager 102 the install/change logic (FIG. 3) will be processed by the storage system manager 102.

Figure 3:
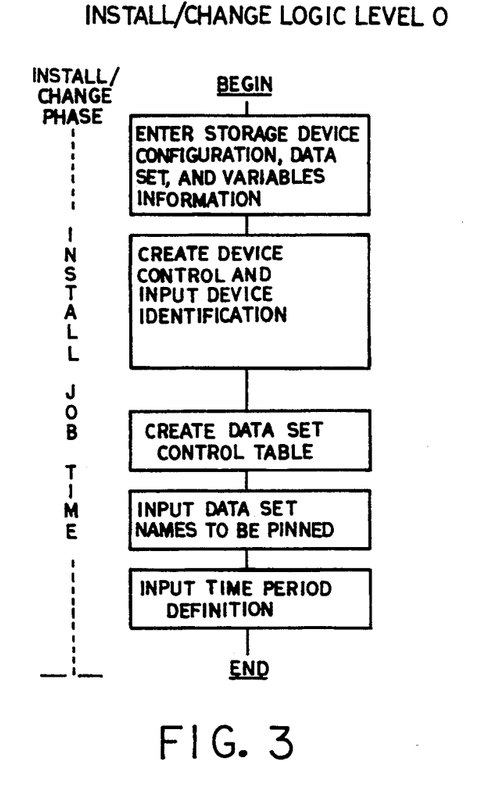
FIG. 3 is a flow chart showing the logical steps by the Storage System Manager during installation or change by the Storage System Manager according to the invention.

The storage system manager will provide for the entering of information by the user which includes device name, device type (channel, controller, storage device, ...), number of data ports, data transfer rate, average access time, and storage capacity. Additionally it will provide for the entering by the user of the device identification, device name, source address, sink address, and device status (add new, add existing, remove, stable, unstable). Additionally it will provide for the user to enter the start time of p time periods. Additionally it will provide for the user to enter storage capacity utilization, length of time for data characterization, data path utilization, data access mechanism utilization, frequency of balancing, and time of day for balancing.

Additionally at install/change time the storage system manager 102 will automatically scan the volume table of contents (VTOC) of all storage devices that have the device status of "add existing" and will enter the data identification (I.D.), resident volume identification (I.D.), and action flag (add new). Additionally it will provide for the user to enter "pinned" status.

This completes the install/change phase of processing by the storage system manager 102.

Upon the incidence of system run time when user application processing occurs, the storage system manager 102 will process the system run time logic (FIG. 4).

During the phase the storage system manager 102 provides for the input from the central processing unit 101 of input/output activity data. Additionally the storage system manager 102 provides for the analysis of the input/output activity data to determine the data collection I.D., data collection storage location, input/output action (allocate, open, close, read, write, ...), and time of occurrence. Additionally it provides for the logging of data collection I.D., data collection storage location, input/output action code, and time stamp.

The storage system manager 102 provides a means of periodically comparing:
the time of date for balancing and real time and
the date the storage system was last balanced and the current date.

Additionally if the real time is equal to or greater than the time of day for balancing, and if the current date when subtracted from the date the storage system was last balanced defines a period that is equal to or greater than the period of balancing, then the storage system manager 102 initiates the balancing phase.

Upon the incidence of the balancing phase, the storage system manager 102 will process the balancing logic (FIG. 5). During this phase the storage system manager 102 provides a means to read a data collection activity log. In addition the storage system manager 102 provides a means to analyze the data from the activity log to determine the data I.D., the resident volume I.D., the type of activity (allocate, delete, open, append, close, get, put), and the size of the data collection. Additionally the storage system manager 102 provides a means to add a data collection if the input/output activity type is an allocate. Additionally it provides a means of recording a delete if the input/output activity type is a delete. Additionally it provides a means of updating the open period vector for the designated data collection if the input/output activity is an open or close. Additionally it provides a means to accumulate a data access count for the designated data collection for each of the several contiguous periods from the time the data collection is opened until it is closed. Each of the several contiguous periods is equal to the period for the data characterization.

Additionally the storage system manager 102 provides a means for calculating the data storage characterization for each of the contiguous periods for the identified data collection by dividing the access count by the number of seconds in a period for data characterization. Furthermore, the storage system manager 102 divides the quotient thus obtained by the size of the data collection to determine the data collection storage characterization. Additionally a means is provided to compare the newly calculated data storage factor for the specified time period with the current data storage specification for the specified time period. If the newly calculated storage characterization is greater in terms of accesses or size, the storage system manager replaces the data storage characterization for the specified time period with the newly calculated accesses and/or size. Said processing for calculating the data storage characterization for each of the data collections is repeated for each entry in the data collection activity log.

Figure 6:
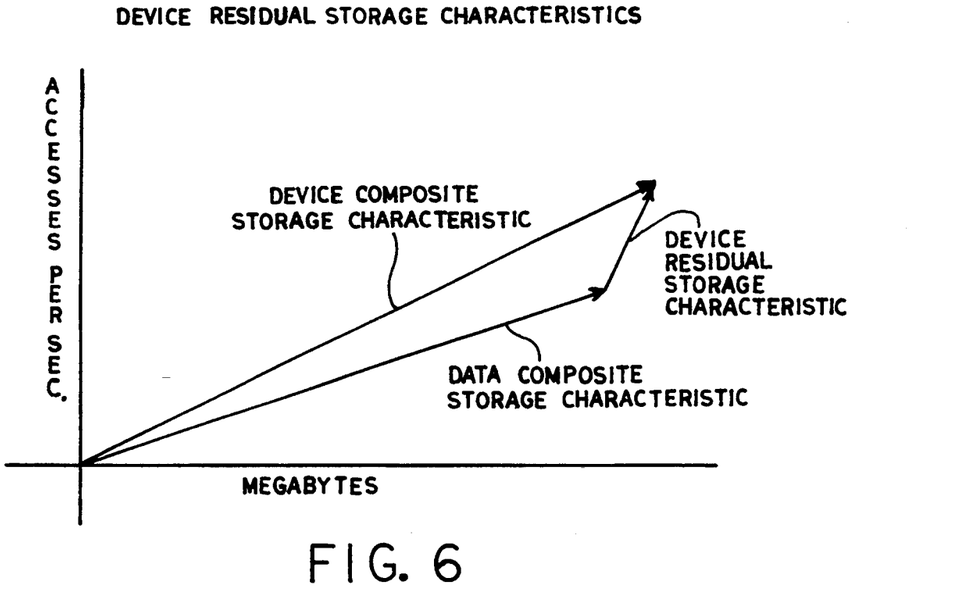
FIG. 6 is a graph showing the Device Composite Storage Characteristic, the Device Residual Storage Characteristic, and the Data Composite Storage Characteristic.
Figure 8:
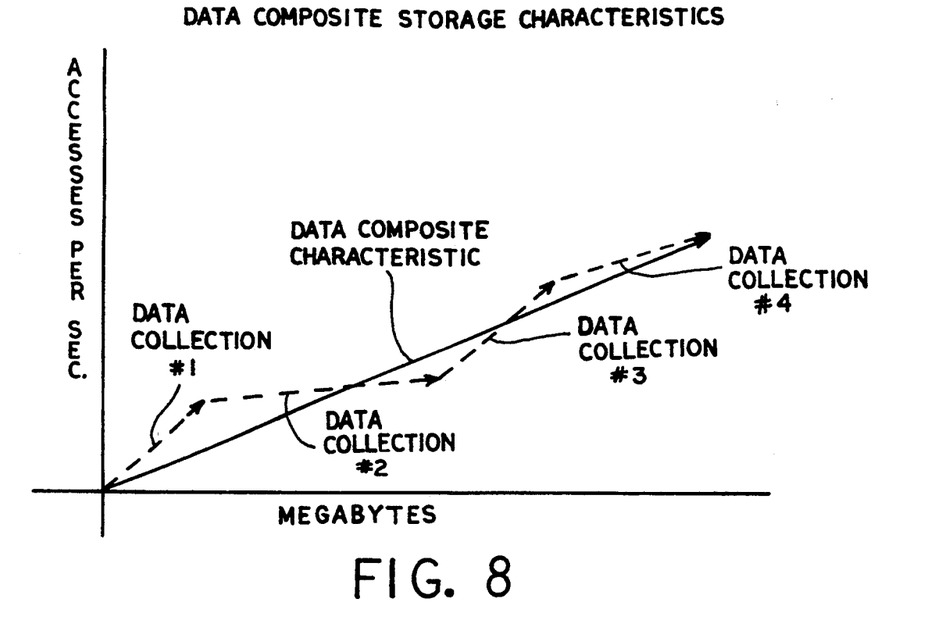
FIG. 8 is a graph showing the Data Composite Storage Characteristic as a vector sum of the Data Collection Storage Characteristics of several data collections.

Additionally the storage manager 102 provides a means to reach the device I.D. and to search for all data collections on a storage device having the same resident column I.D. And to perform a vector addition to derive the data composite storage characteristic (FIG. 8). Additionally a means is provided to retrieve the device composite storage characteristic and to take the vector difference by subtracting the data composite storage characteristic (FIG. 8) from the device composite storage characteristic to derive the device residual storage characteristic (FIG. 6). Additionally to store the newly derived device residual storage characteristic.

Figure 9:
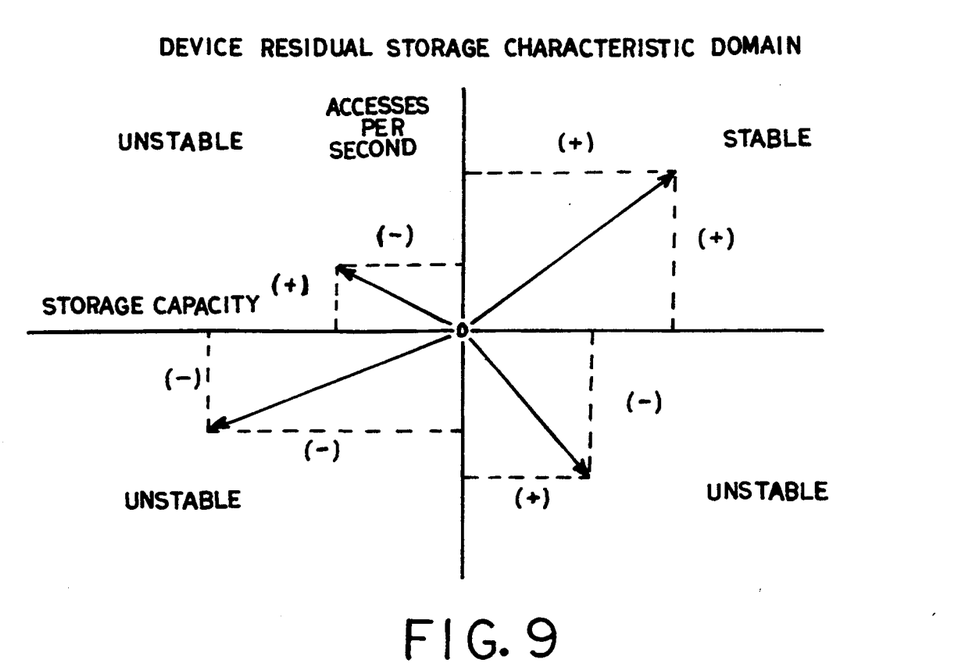
FIG. 9 is a graph showing the Device Residual Storage Characteristic Domain.

Following the completion of update the device residual storage characteristic for each of the storage devices, the storage system manager 102 provides a means for reading the device residual storage characteristic. Additionally a means to analyze the device residual storage characteristic by examining the angular displacement of the device residual storage characteristic (FIG. 9). If the angle does not lie within the range of 0 degree to 90 degree inclusive there is a potential problem and an unstable condition is recorded.

Figure 10:
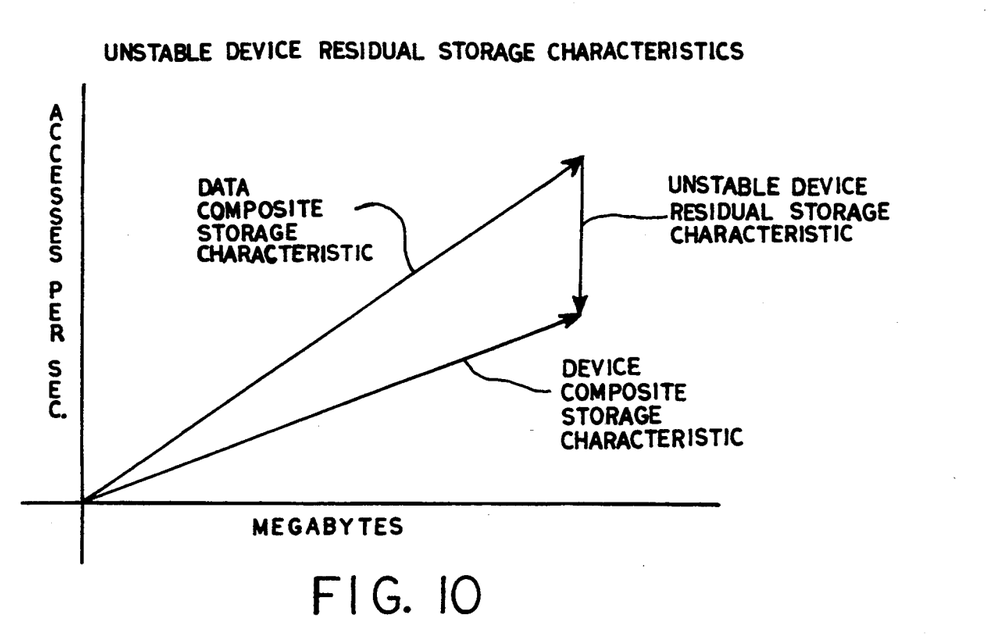
FIG. 10 is a graph showing an Unstable Device Residual Storage Characteristic.

Following the analysis for each of the storage devices, the storage system manager 102 provides a means to read the device status. Additionally it provides the means to compare the device status and if a device is an unstable device to search for a data collection that resides on the storage device being considered by comparing the resident volume I.D. to the device I.D. Additionally a means is provided to compare the data collection storage characteristic of the resident data collections to the unstable device residual storage characteristic (FIG. 10) of the unstable storage device. Additionally a means is provided to break the data collection storage characteristic vector and the unstable device residual storage characteristic vector into their components of accesses and size. If the magnitudes of the data collection accesses and size are greater than the magnitudes of the device residual storage accesses and size, the removal of that data set will return the device to a stable condition and the data collection is identified to be moved. Additionally a means is provided to enter a move action in the action flag of the data collection to be moved. Furthermore a means is provided to select the resident data collection that most nearly matches is provided to replace an unstable indication for the device status if the angular displacement of the device residual storage characteristic is within the bound 0 degree and 90 degree inclusive. Additionally a means is provided to calculate the composite storage characteristic following the setting of the action flag to move a data collection, and to record the result of that calculation as the device pending composite storage characteristic.

Furthermore the storage system manager 102 provides a means for reading the action flag and storage characteristic or each data collection, and if the action flag indicates the data collection is to be moved, a means is provided to compare the data storage characteristic to the device pending residual storage characteristic of each of the storage devices. When a match is achieved, a means is provided to calculate a new pending device composite storage characteristic and to record that information. Additionally a means is provided to record the device I.D. as the target volume I.D. for the data collection.

Additionally the storage system manager 102 provides a means to generate a set of data move instructions that is transmitted to the central processing unit 101 and entered in the normal job stream. The central processing unit 101 then executes the data move instructions as a normal procedure which uses standard utility programs to move the data. The movement of the data collection will be recorded by the storage system manager 102 as previously described and as a result of the change of the data location the storage system manager 102 will update the data collection information and the device control information during the next balancing phase.

Additionally the storage system manager 102 provides a means of preparing reports to show the location of data collections, to provide a storage system device inventory, and to identify real and potential storage system problems.

Because the storage manager 102 provides a means for changing of the storage system specification, collecting input/output information, data reduction, and storage system balancing, the use and/or configuration of the central processing unit 101 and the storage system 115 can change as a result of the addition, deletion, and/or modification of applications and/or devices without interrupting the effective functioning of the data storage system 115 or the central processing unit 101.

Figure 2:
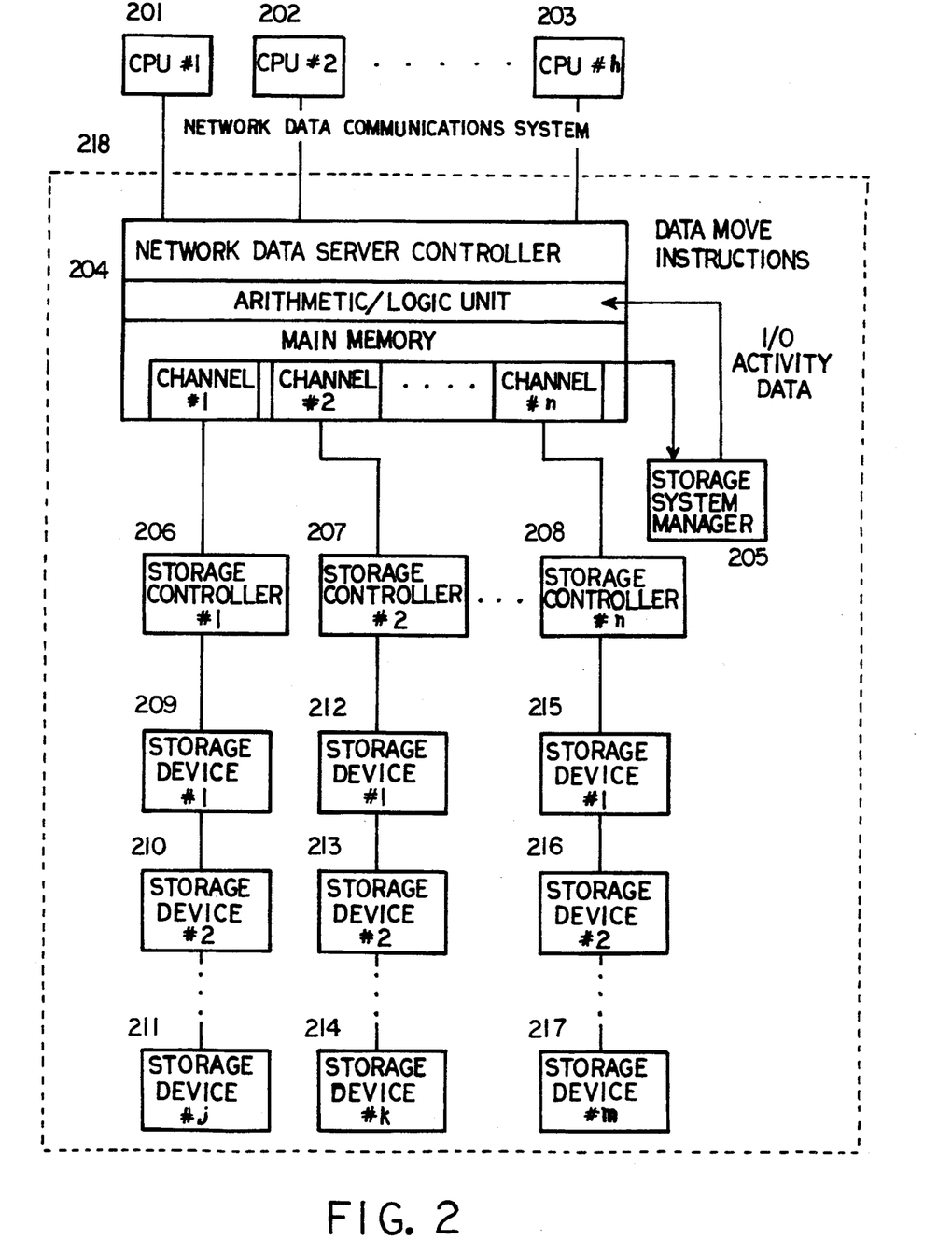
FIG. 2 is a schematic diagram of a data storage system serving as a data server in a network of multiple central processing units according to an embodiment of the invention.

FIG. 2 shows the construction of a second preferred embodiment which is principally similar to the first embodiment and mainly concerns the storage system manager 205 as it relates to a network involving h remote central processing units 201, 202, and 203. In this embodiment the remote central processing units 201, 202, 203 are connected to the network data server controller 204. Channels 1, 2, ... n are in the network data server controller 204 and the storage system manager 205 receives input/output activity data from the network data server controller 204, and sends data move instructions to the network data server controller 204. The storage system manager 205 must provide the same function in this embodiment as storage system manager 102 provided in the previously described embodiment.

As will be evident from the foregoing, the method of the present invention provides for substantially automatically managing and daily updating the allocation of data sets among a plurality of data storage devices of a computing apparatus. The method provides for minimizing system degradation and achieves substantially uniform distribution of data sets among all the storage devices, with the data sets being allocated to storage devices that have reference characteristics most nearly congruent with the characteristics of the data set.

An additional advantage and feature of the method of the present invention is that additional data devices can easily and substantially automatically be added to the other storage devices of the storage system. The method of the present invention automatically transfers data sets from existing storage devices during the balancing of date sets among the storage devices. In adding a device, all that is required is to enter the new device and its characteristics into the program being run by the computer. During balancing, the program recognizes that the new storage device has a residual storage factor much greater than the average, and data sets will automatically be moved from the existing storage devices to the new device to achieve a more balanced distribution of data sets among all the storage devices including the new storage device.

Storage devices can just as easily be removed from the storage system. In removing a storage device, the operator simply alter the characteristic of the device to be removed such that its residual storage factor is artificially made small even with only a single data set on the device. The method of the present invention will then automatically move data sets from the storage device that is to be removed from the system until there is no data sets left on that storage device. The device can then be removed from the system without requiring disruption or downtime of the computing apparatus.

Although preferred embodiments of the method of the present invention have been described, it is to be understood that the present disclosure is made by way of example and that various other embodiments are possible without departing from the subject matter coming within the scope of the following claims, which subject matter is regarded as the invention.

I claim:

1. A method for managing the allocation of data sets among storage devices of a computing apparatus in such a manner that system degradation will be minimized and the storage devices will be utilized with maximum efficiency by placement of each of the data sets on a storage device whose uncommitted storage volume and access capability most nearly meets the requirement of that particular data set and by further placing data sets in such a way that access activity to the data sets will be distributed substantially uniformly across all the storage devices, said method comprising calculating a data storage factor of each data set, wherein the data storage factor is the vector sum, in a cartesian coordinate system, of the number of accesses per unit time to the particular data set and the volume of data in that data set;

monitoring and recording data set access activity as a function of time;

calculating a machine storage factor of each storage device, wherein the machine storage factor is the vector sum, in a cartesian coordinate system, of the total storage capacity of the particular storage device and the number of accesses the particular device can sustain per second;

calculating a residual storage factor of each storage device, wherein residual storage factor is indicative of the available or uncommitted storage capacity of the particular device, with the residual storage factor being the vector difference, in a cartesian coordinate system, of the machine storage factor of the particular device and the vector sum, in a cartesian coordinate system, of the data storage factors of the data sets stored on that particular storage device;

allocating the data set to a storage device that has sufficient available space and whose residual storage factor most nearly matches and exceeds the data storage factor of the data set being allocated;

dividing each operational day of said computing apparatus into a predetermined number of time periods;

determining the time period during the previous operational day that the storage devices as a group were least utilized;

using the time period determined in the preceding step to move data sets among the storage devices so as to balance the residual storage factors of all the storage devices as a group for each of the time periods, starting with the time period of maximum use of the storage devices and proceeding progressively to the time period of minimum use of the storage devices.

2. A method in accordance with claim 1, wherein the moving of data sets among the storage devices to balance the residual storage factors of all the storage devices for each time period is done by calculating the average residual storage factor for all the storage devices;

removing one or more data sets from any storage device whose residual storage factor is less than a preset lower limit; and reallocating any data set removed from a storage device to another storage device whose residual storage factor after reallocation of such data set is equal to or greater than said preset lower limit.

3. A method in accordance with claim 2, wherein the moving of data sets among the storage devices to balance the residual storage factors of all the storage devices for each time period is done by summing the residual references of the storage devices, wherein residual reference is defined as the additional accesses per second the particular device can sustain in addition to the accesses per second allocated to existing data sets on that device;

summing the residual volumes of the storage devices, wherein the residual volume is defined as the additional volume of the particular device that is not allocated to existing data sets on that device;

calculating the magnitude of the composite residual storage factor defined as the square root of the sum of the squares of the summed residual references and the summed residual volumes;

calculating the direction of the composite residual storage factor, wherein said direction of the composite residual storage factor is defined as the angle a having the tangent equal to the summed residual references divided by the summed residual volumes;

calculating an average composite residual storage factor per storage device defined as the magnitude of the composite residual storage factor divided by the number of data storage devices, with the average composite residual storage factor having a direction defined by the angle u whose tangent is equal to the summed residual references divided by the summed residual volumes;

calculating the direction of the residual storage factor of each storage device defined as the angle $\beta$ whose tangent is equal to the residual reference of the particular storage device divided by the residual volume of the particular storage device;

calculating a storage factor limit of each storage device, said storage factor limit defined as the residual storage factor of the particular storage device minus the average composite residual storage factor per storage device;

calculating the vector divverence of the device residual storage factor minus the composite residual storage factor; and if the vector difference of the device residual storage factor minus the composite residual storage factor is not in the first quadrant, one or more data sets is moved from that particular data storage device to another data storage device having a residual storage factor that is greater than the residual storage factor of the particular storage device.

* * * * *